(12) United States Patent
Ji et al.

(10) Patent No.: US 9,631,704 B2
(45) Date of Patent: Apr. 25, 2017

(54) MULTI-STAGES AUTOMATIC TRANSMISSION FOR VEHICLE

(71) Applicant: Hyundai Motor Company, Seoul (KR)

(72) Inventors: Seong-Wook Ji, Ansan-si (KR); Jae-Chang Kook, Hwaseong-si (KR); Won-Min Cho, Hwaseong-si (KR); Myeong-Hoon Noh, Seongnam-si (KR); Kang-Soo Seo, Yongin-si (KR); Seong-Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 197 days.

(21) Appl. No.: 14/723,092

(22) Filed: May 27, 2015

(65) Prior Publication Data

US 2016/0108996 A1 Apr. 21, 2016

(30) Foreign Application Priority Data

Oct. 16, 2014 (KR) ........................ 10-2014-0139591

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ..... F16H 2200/0069; F16H 2200/2012; F16H 2200/2046
See application file for complete search history.

(56) References Cited

U.S. PATENT DOCUMENTS

| 7,614,975 | B2 | 11/2009 | Seo |
| 7,651,431 | B2 | 1/2010 | Phillips et al. |
| 8,591,376 | B1 | 11/2013 | Shim |
| 8,591,377 | B1 | 11/2013 | Hoffman |
| 8,663,055 | B2 | 3/2014 | Brehmer |
| 8,715,131 | B2 | 5/2014 | Mellet |
| 8,821,336 | B2 | 9/2014 | Wiltin et al. |
| 2005/0003924 | A1 | 1/2005 | Tabata et al. |
| 2008/0070740 | A1 | 3/2008 | Gumpoltsberger |
| 2008/0125269 | A1 | 5/2008 | Gumpoltsberger |
| 2008/0242492 | A1 | 10/2008 | Phillips |
| 2009/0264244 | A1 | 10/2009 | Hart |

(Continued)

FOREIGN PATENT DOCUMENTS

| DE | 102009019046 A1 | 11/2010 |
| JP | 2012-112292 | 6/2012 |

(Continued)

OTHER PUBLICATIONS

Search Report dated Mar. 2, 2016 for European Patent Application No. 15168095.6.

(Continued)

*Primary Examiner* — Stacey Fluhart
(74) *Attorney, Agent, or Firm* — Morgan, Lewis & Bockius LLP

(57) ABSTRACT

A multi-stages automatic transmission for a vehicle may include first, second, third and fourth planetary gear sets, each including first, second and third rotation elements, respectively, and friction members including first, second, third and fourth clutches and first and second brakes.

18 Claims, 3 Drawing Sheets

(56) References Cited

U.S. PATENT DOCUMENTS

| | | | |
|---|---|---|---|
| 2010/0069195 A1* | 3/2010 | Baldwin | F16H 3/66 475/276 |
| 2011/0045940 A1 | 2/2011 | Gumpoltsberger | |
| 2011/0045942 A1 | 2/2011 | Gumpoltsberger | |
| 2011/0177910 A1* | 7/2011 | Wittkopp | F16H 3/66 475/275 |
| 2011/0245013 A1 | 10/2011 | Kim | |
| 2012/0165153 A1* | 6/2012 | Borgerson | F16H 3/666 475/271 |
| 2012/0172173 A1 | 7/2012 | Wittkopp et al. | |
| 2013/0023376 A1* | 1/2013 | Hart | F16H 3/66 475/275 |
| 2013/0316870 A1 | 11/2013 | Goleski | |
| 2014/0100073 A1 | 4/2014 | Lee | |
| 2014/0106923 A1 | 4/2014 | Borgerson et al. | |
| 2014/0235399 A1* | 8/2014 | Goleski | F16H 3/62 475/275 |
| 2015/0099603 A1 | 4/2015 | Goleski | |
| 2015/0167792 A1* | 6/2015 | Baldwin | F16H 3/66 475/154 |
| 2016/0040754 A1* | 2/2016 | Schoolcraft | F16H 3/64 475/269 |
| 2016/0108995 A1 | 4/2016 | Ji | |

FOREIGN PATENT DOCUMENTS

| | | |
|---|---|---|
| JP | 2013-072464 A | 4/2013 |
| JP | 2013-190048 A | 9/2013 |
| JP | 2013-199957 A | 10/2013 |
| JP | 2013-199959 A | 10/2013 |
| JP | 2013-204706 A | 10/2013 |
| JP | 2013-204709 A | 10/2013 |
| JP | 2013-204717 A | 10/2013 |
| JP | 2014-035056 A | 2/2014 |
| JP | 2014-035057 A | 2/2014 |
| JP | 2014-105848 A | 6/2014 |
| JP | 2014-105849 A | 6/2014 |
| JP | 2014-105850 A | 6/2014 |
| KR | 10-2012-0119451 A | 10/2012 |
| KR | 10-2013-0000171 A | 1/2013 |
| KR | 2013-0031457 A | 3/2013 |
| KR | 2013-0077146 A | 7/2013 |
| KR | 10-2014-0046240 A | 4/2014 |
| KR | 10-1416108 B1 | 7/2014 |
| KR | 2014-0101859 A | 8/2014 |
| WO | WO 2013/100620 A1 | 7/2013 |

OTHER PUBLICATIONS

Christoph Dorr et al., The nine-speed automatic transmission 9G-Tronic of Mercedes-Benz, *ATZ-Automobiltechnische Zeitxchrift*, Jan. 31, 2014, Jan. 2014, pp. 40-45, Germany.

\* cited by examiner

FIG.2

|   | C1 | C2 | C3 | C4 | B1 | B2 |
|---|----|----|----|----|----|----|
| 1 |    | ●  | ●  |    | ●  |    |
| 2 | ●  | ●  |    |    | ●  |    |
| 3 | ●  |    |    |    | ●  | ●  |
| 4 | ●  |    | ●  |    | ●  |    |
| 5 | ●  |    | ●  |    |    | ●  |
| 6 | ●  |    | ●  | ●  |    |    |
| 7 | ●  |    |    | ●  |    | ●  |
| 8 |    |    | ●  | ●  |    | ●  |
| 9 |    | ●  |    | ●  |    | ●  |
| 10 |   | ●  | ●  |    |    | ●  |
| R |   |    | ●  | ●  | ●  |    |

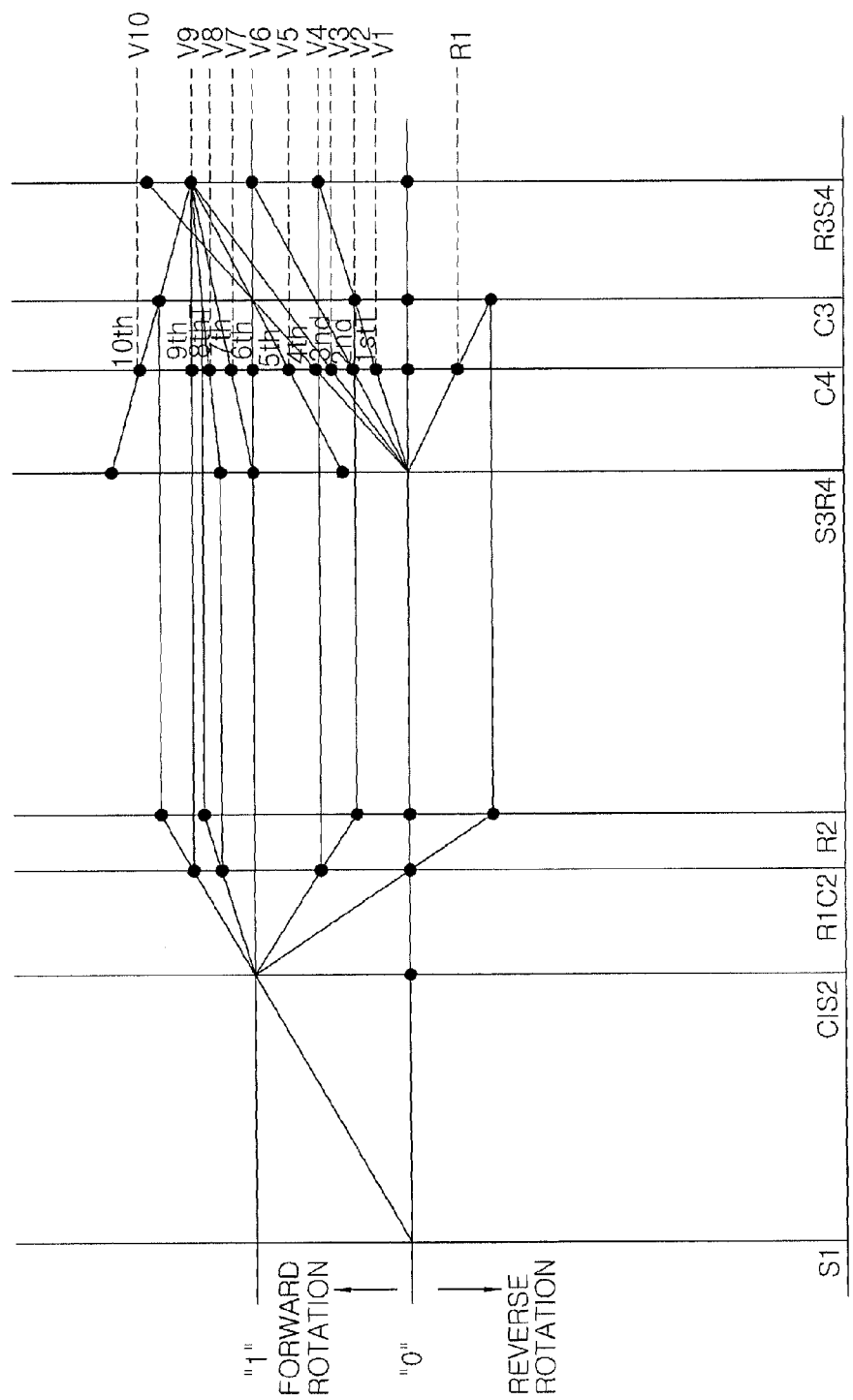

MULTI-STAGES AUTOMATIC TRANSMISSION FOR VEHICLE

CROSS-REFERENCE TO RELATED APPLICATION

The present application claims priority to Korean Patent Application No. 10-2014-0139591, filed Oct. 16, 2014, the entire contents of which is incorporated herein for all purposes by this reference.

BACKGROUND OF THE INVENTION

Field of the Invention

The present invention relates to a multi-stages automatic transmission for a vehicle, and more particularly, to a multi-stages automatic transmission for a vehicle equipped with a gear train embodying 10 forward speeds and 1 reverse speed with gear efficiency 98.6%.

Description of Related Art

Recently, the technology development need for performance improvement has emerged similarly in the power train field by requirement of a higher need for fuel efficiency improvements due to strengthening of environmental regulations or rising oil prices.

Appropriate power train technologies corresponding to the need have been provided, including an engine downsizing technology and a multi-staging technology of an automatic transmission. The engine downsizing has merits of reducing weight and improving fuel efficiency, and particularly, the automatic transmission multi-staging has merits of securing drivability and competitiveness of fuel efficiency at the same time through design of an excellent gear ratio in terms of power performance and fuel efficiency by using more shift stages as compared to a 4-speed (or 5-speed), and 1 reverse speed automatic transmission.

An instance of such multi-staging of the automatic transmission, includes an 8 forward speed and 1 reverse speed automatic transmission by combining three planetary gear sets and six friction elements, and 9 forward speed and 1 reverse speed automatic transmission by combining four planetary gear sets, four friction elements and two dog clutches.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

In the related art, a problem arises in that in an automatic transmission, when the number of shift stages is increased, the number of internal components that make up the automatic transmission is increased when implementing the shift stages with a gear train through a planetary gear set. Thus, in the multi-staging of the automatic transmission, above all it is important to achieve drivability and fuel efficiency competitiveness with the gear train structure without increasing the number of internal components thus worsening vehicle mountability, increasing manufacturing cost and weight and decreasing power transmission efficiency.

Therefore, an optimal structure of the gear train which may lead to maximum efficiency with fewer components should be applied to the development of the 10 forward speed and 1 reverse speed automatic transmission in order to enhance the fuel efficiency effect with the increased shift stages compared to eight forward stages and one reverse stage of the automatic transmission or nine forward speed and 1 reverse speed automatic transmission.

Various aspects of the present invention are directed to providing a multi-stages automatic transmission for a vehicle that improves drivability of the vehicle using an operation point of a low RPM range of an engine by implementing 10 forward speeds and 1 reverse speed with the gear train using four planetary gear sets, four clutches and two brakes, and especially, achieves better fuel efficiency improvement with the gear train implementing gear efficiency of 98.6%.

According to various aspects of the present invention, a multi-stages automatic transmission for a vehicle includes first, second, third and fourth planetary gear sets, each including first, second and third rotation elements, respectively and friction members including first, second, third and fourth clutches and first and second brakes, in which an input shaft may be fixedly connected to the second rotation element of the fourth planetary gear set and the first rotation element of the third planetary gear set, the third rotation element of the fourth planetary gear set may be fixedly connected to the third rotation element of the second planetary gear set, the third rotation element of the third planetary gear set may be fixedly connected to the second rotation element of the second planetary gear set, the third rotation element of the second planetary gear set may be fixedly connected to the first rotation element of the first planetary gear set, and an output shaft may be fixedly connected to the second rotation element of the first planetary gear set.

The first break may fix the third rotation element of the first planetary gear set, the second break may fix the first rotation element of the fourth planetary gear set, the first clutch may connect the second rotation element of the third planetary gear set with the second rotation element of the fourth planetary gear set, the second clutch may connect the second rotation element of the third planetary gear set with the third rotation element of the fourth planetary gear set, the third clutch may connect the first rotation element of the second planetary gear set with the third rotation element of the first planetary gear set, and the fourth clutch may connect the second rotation element of the third planetary gear set with the third rotation element of the first planetary gear set.

The first planetary gear set and the second planetary gear set may comprise a first complex planetary gear set, the third planetary gear set and the fourth planetary gear set may comprise a second complex planetary gear set, and a continuous combination route between the first complex planetary gear set and the second complex planetary gear set may be formed by the second rotation element of the second planetary gear set and the third rotation element of the third planetary gear set.

The first planetary gear set may comprise a first sun gear as the first rotation element, a first carrier as the second rotation element, and a first ring gear as the third rotation element, the second planetary gear set may comprise a second sun gear as the first rotation element, a second carrier as the second rotation element, and a second ring gear as the third rotation element, the third planetary gear set may comprise a third sun gear as the first rotation element, a third carrier as the second rotation element, and a third ring gear as the third rotation element, and the fourth planetary gear set may comprise a fourth sun gear as the first rotation element, a fourth carrier as the second rotation element, and a fourth ring gear as the third rotation element.

The first sun gear among the first sun gear, the first carrier and the first ring gear of the first planetary gear set may be fixedly connected with the second ring gear, the first carrier may be continuously fixedly connected with the output, and the first ring gear may be fixedly connected to the first brake, selectively connected with the third carrier through the fourth clutch and selectively connected with the second sun gear through the third clutch.

The second sun gear among the second sun gear, the second carrier and the second ring gear of the second planetary gear set may be selectively connected with the first ring gear through the third clutch, the second carrier may be fixedly connected with the third ring gear, and the second ring gear may be fixedly connected with the first sun gear and the fourth ring gear.

The third sun gear among the third sun gear, the third carrier, and the third ring gear of the third planetary gear set may be fixedly connected with the fourth carrier, the third carrier may be selectively connected with the fourth ring gear through the second clutch, and the third ring gear may be fixedly connected with the second carrier.

The fourth sun gear among the fourth sun gear, the fourth carrier, and the fourth ring gear of the fourth planetary gear set may be fixedly connected with the second brake, the fourth carrier may be selectively connected with the third carrier through the first clutch and fixedly connected with the input shaft, and the fourth ring gear may be fixedly connected with the second ring gear.

As such the multi-stages automatic transmission of the present invention implements 10 forward speeds and 1 reverse speed with the gear train using the four planetary gear sets, the four clutches, and the two brakes, thereby realizing an effect that the elements for a transmission implementing 10 forward speeds and 1 reverse speed are minimized.

Also, the multi-stages automatic transmission of the present invention has an effect that simultaneously achieves the fuel efficiency improvement according to 10 forward speeds by the structure of the optimized gear train with gear efficiency of 98.6% and improves drivability of the vehicle by using an operation point of a low RPM range of the engine.

In addition, the present invention has an effect of responding quickly to a market for the multi-stages automatic transmissions having an increased mounting ratio of more than 7-speed automatic transmission.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational view at each shift stage of friction members applied to a gear train of the exemplary multi-stages automatic transmission according to the present invention.

FIG. 3 is a lever diagram of a gear train according to the present invention.

Figure 1:
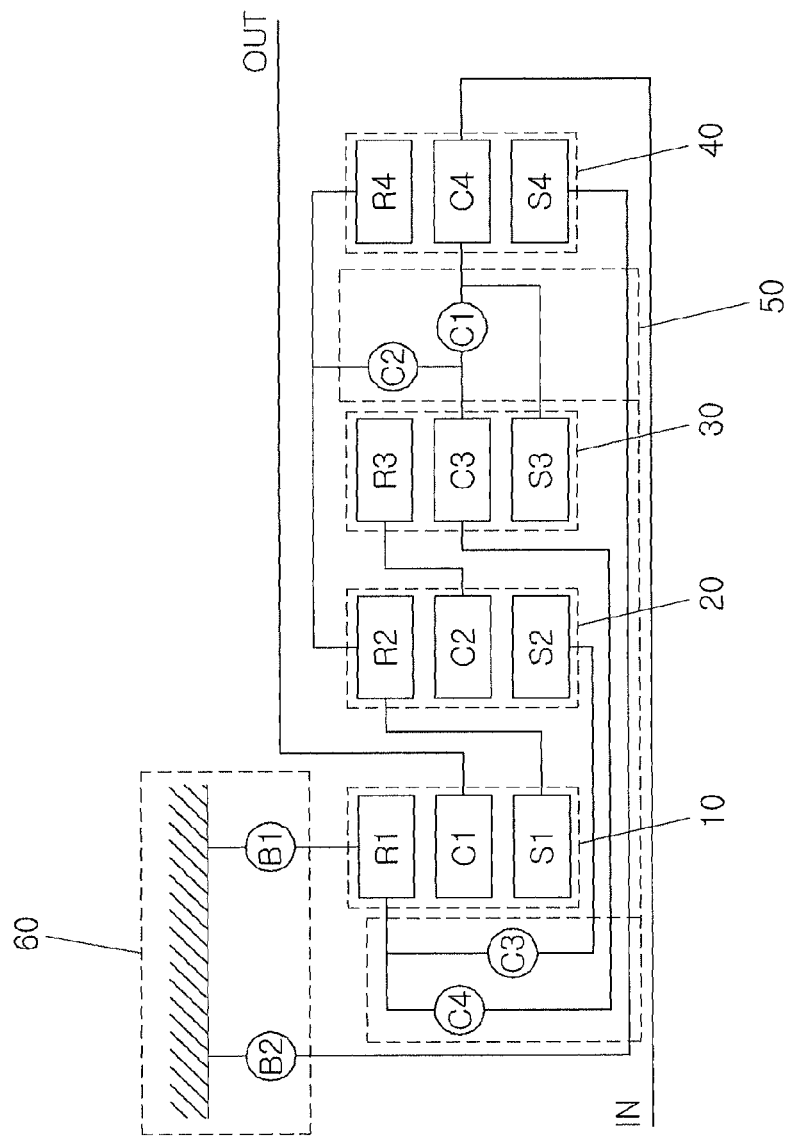
FIG. 1 is a gear train configuration of an exemplary multi-stages automatic transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 shows a gear train configuration of a multi-stages automatic transmission for a vehicle according to the present invention. As shown, an input of a gear train is achieved through a turbine shaft of a torque converter by which the rotational power from an engine crank shaft is torque-converted and then inputted, an output of a gear train is connected to a well-known differential device rotating driving wheels.

To achieve this, an input shaft IN as an input member of the gear train is connected to the turbine shaft of the torque converter, an output shaft OUT as output member is connected to the differential device. Further, the gear train may include four planetary gear sets 10, 20, 30 and 40 disposed in the same shaft line, a clutch set 50 composed of a first, second, third and fourth clutches C1, C2, C3, C4, a brake set 60 composed of a first and a second brakes B1, B2. Particularly, the four planetary gear sets 10, 20, 30, 40 may be composed of a first complex planetary gear device and a second complex planetary device which are connected each other through at least one continuous combination route and at least two selective combination route. For example, the first complex planetary gear set may be composed of a pair with the first and second planetary gear set 10, 20 and the second complex planetary gear set may be composed of a pair with the third and fourth planetary gear set 30, 40.

In the concrete, each four planetary gear sets 10, 20, 30, 40 may be composed of a first, second and third rotation elements, 10 forward speeds and 1 reverse speed may be embodied by the selective operation of six friction members C1, C2, C3, C4, B1, B2.

The first rotation element of the first planetary gear set 10 may be fixedly connected with the third rotation element of the second planetary gear set 20, the second rotation element of the first planetary gear set 10 may be continuously fixedly connected to the output shaft OUT, and a third rotation element of the first planetary gear set 10 may be fixedly connected to the first brake B1. Particularly, the third rotation element of the first planetary gear set 10 may be selectively connected with the second rotation element of the third planetary gear set 30 through the fourth clutch and selectively connected with the first rotation element of the second planetary gear set 20 through the third clutch.

The first rotation element of the second planetary gear set 20 may be selectively connected with the third rotation element of the first planetary gear set 10 through the third clutch, a second rotation element of the second planetary gear set 20 may be fixedly connected with the third rotation element of the third planetary gear set 30, and the third rotation element of the second planetary gear set 20 may be fixedly connected with the first rotation element of the first planetary gear set 10 and the third rotation element of the fourth planetary gear set 40.

A first rotation element of the third planetary gear set 30 may be fixedly connected with a second rotation element of the fourth planetary gear set 40, a second rotation element of the third planetary gear set 30 may be selectively connected to a second rotation element of the fourth planetary gear set 40 through the first clutch C1, and a third rotation element of the third planetary gear set 30 may be fixedly connected with a second rotation element of the second planetary gear set 20.

A first rotation element of the fourth planetary gear set 40 may be fixedly connected with the second brake B2, a second rotation element of the fourth planetary gear set 40 may be selectively connected to a second rotation element of the third planetary gear set 30 through the first clutch C1 and fixedly connected with the input shaft IN, and a third rotation element of the fourth planetary gear set 40 may be fixedly connected with a third rotation element of the second planetary gear set 20.

In various embodiments, the first, second and third rotation elements of the first planetary gear set 10 are a first sun gear S1 as the first rotation element, a first carrier CR1 as the second rotation element and a first ring gear R1 as the third rotation element, respectively. The first, second and third rotation elements of the second planetary gear set 20 are a second sun gear S2 as the first rotation element, a second carrier CR2 as the second rotation element and a second ring gear R2 as the third rotation element, respectively. The first, second and third rotation elements of the third planetary gear set 30 are a third sun gear S3 as the first rotation element, a third carrier CR3 as the second rotation element and a third ring gear R3 as the third rotation element, respectively. The first, second and third rotation elements of the fourth planetary gear set 40 are a fourth sun gear S4 as the first rotation element, a fourth carrier CR4 as the second rotation element and a fourth ring gear R4 as the third rotation element, respectively.

Specifically, the first sun gear S1 may be fixedly connected with the second ring gear R2, the first carrier CR1 may be continuously fixedly connected with the output shaft OUT, and the first ring gear R1 may be fixedly connected with the first brake B1, selectively connected with the third carrier CR3 through the fourth clutch C4 and the second sun gear S2 through the third clutch C3. Further, the second sun gear S2 may be selectively connected with the first ring gear R1 through the third clutch C3, the second carrier CR2 may be fixedly connected with the third ring gear R3, and the second ring gear R2 may be fixedly connected with the first sun gear S1 and the fourth ring gear R4. The third sun gear S3 may be fixedly connected with the fourth carrier CR4, the third carrier CR3 may be selectively connected with the fourth carrier CR4 through the first clutch C1, and the third ring gear R3 may be fixedly connected with the second carrier CR2. Further, the fourth sun gear S4 may be fixedly connected to the second brake B2, the fourth carrier CR4 may be selectively connected with the third carrier CR3 through the first clutch C1 and fixedly connected with the input shaft IN, and the fourth ring gear R4 may be fixedly connected with the second ring gear R2.

Therefore, the continuous combination routes of the first complex planetary gear set composed of the first and second planetary gear set 10, 20 and the second complex planetary gear set composed of the third and fourth planetary gear set 30, 40 may be formed by the second carrier CR2 and the third ring gear R3. Further, the fourth carrier CR4 may act as an input element of the gear train and the first carrier CR1 may act as an output element of the gear train.

Meanwhile, the first and second brakes B1, B2 are disposed in front of the first planetary gear set 10, the first and second clutches C1, C2 are disposed between the rear of the third planetary gear set 30 and the front of the fourth planetary gear set 40, the third and fourth clutches C3, C4 are in front of the first planetary gear set 10. By applying such arrangement, the hydraulic pressure passage supplied to the friction members may be easily formed and the distribution of weight is uniform, thereby improving the total weight balance of the automatic transmission.

Concretely, the first brake B1 may fix the first ring gear R1 and the second brake B2 may fix the fourth sun gear S4. The first clutch C1 may selectively connect the third carrier CR3 and the fourth carrier CR4, the second clutch C2 may selectively connect the third carrier CR3 and the fourth ring gear R3, the third clutch C3 may selectively connect the first ring rear R1 and the second ring gear R2, and the fourth clutch C4 may selectively connect the first ring gear R1 and the third carrier CR3.

Therefore, since each shift stage in the gear train of the various embodiments may be embodied by coupling all three operation elements, the number of inoperative friction elements is reduced, thereby decreasing friction drag loss. This may improve power transmission efficiency and ultimately may contribute to improve fuel efficiency of a vehicle. Further, the first, second, third and fourth clutches C1, C2, C3, C4 and the first and second brakes B1, B2 consisting of six friction members may be made up of a hydraulic multi-plates friction combination unit friction-coupled by hydraulic pressure, ordinary ways.

Figure 2:
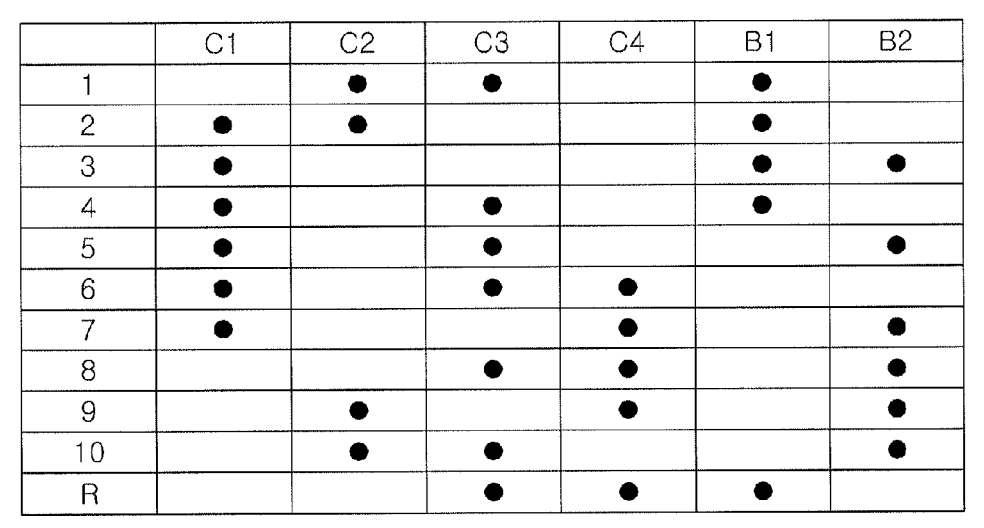

On the other hand, FIG. 2 shows operational elements at each shift stage of the friction members applied to a gear train according to various embodiments of the present invention. FIG. 3 is a lever diagram showing that the first, second, third and fourth clutches C1, C2, C3, C4 and the first brake B1 and the second brake B2 at the gear train according to the present invention are operated in accordance with the operation table of FIG. 2. Particularly, the lever analysis diagram shows a speed ratio relationship embodying the shift stages of the 1st forward speed to the 10th forward speed and the shift stage of the 1 reverse speed, a horizontal line where the first brake B1 and the second brake B2 are positioned represents a rotational speed "0" and an upper horizontal line thereof represents a rotational speed "1.0" having the same rotational speed of the input shaft IN. Furthermore, a vertical line may be set with operation elements of the first, second, third and fourth planetary gear sets 10, 20, 30, 40 from the left sequentially, the intervals thereof are determined according to each gear ratio (the number of teeth of the sun gear/the number of teeth of the ring gear) of the operation elements which are directly connected with each other among the operation elements, and the position setting of each operation element has been well known to those skilled in the power train and thus omitted.

At the 1st forward speed, the second clutch C2, the third clutch C3 and the first brake B1 are operated. Then, the operating of the second clutch C2 connects the third carrier CR3 with the fourth ring gear R4, the operating of the third clutch C3 connects the second sun gear S2 with the first ring gear R1 and the operating of the first brake B1 allows the first ring gear R1 to fix. Due to this, the input of the input shaft IN is transmitted from the fourth ring gear R4 of the fourth planetary gear set 40 through the second ting gear R2 of the second planetary gear set 20 to the first sun gear S1 of the first planetary gear set 10, the output of the 1st forward speed is made at the first carrier CR1 of the first planetary gear set 10 as much as V1 of the horizontal line by forming a speed line of a lever line diagram by complementary operating rotation elements. The 1-speed output of the first carrier CR1 is transmitted to the differential device through the output shaft OUT, thereby the shifting of the 1st forward speed is completed.

At the 2nd forward speed, the first clutch C1 and the second clutch C2, the first brake B1 are operated by releasing of the third clutch C3 and operating of the first clutch C1 in the state of the 1st forward speed. Then, the operating of the first clutch C1 connects the third carrier CR3 with the fourth carrier CR4, the releasing of the third clutch C3 disconnects the second sun gear S2 and the first ring gear R1, and the second clutch C2 and the first brake B1 maintain the operating states thereof, respectively. Due to this, the output of the 2nd forward speed is made at the first carrier CR1 of the first planetary gear set 10 as much as V2 of the horizontal line by forming a speed line of a lever line diagram by complementary operating rotation elements. The 2-speed output of the first carrier CR1 is transmitted to the differential device through the output shaft OUT, thereby the shifting of the 2nd forward speed is completed.

At the 3rd forward speed, the first clutch C1 and the first and second brakes B1 and B2 are operated by releasing of the second clutch C2 and operating of the second brake B2 in the state of the 2nd forward speed. Then, the releasing of the second clutch C2 disconnects the third carrier CR3 and the fourth ring gear R4, the operating of the second brake B2 allows the fourth sun gear S4 to fix, the first clutch C1 and the first brake B1 maintain the operating states thereof, respectively. Due to this, the output of the 3rd forward speed is made at the first carrier CR1 of the first planetary gear set 10 as much as V3 of the horizontal line by forming a speed line of a lever line diagram by complementary operating rotation elements. The 3-speed output of the first carrier CR1 is transmitted to the differential device through the output shaft OUT, thereby the shifting of the 3rd forward speed is completed.

At the 4th forward speed, the first and third clutches C1, C3 and the first brake B1 are operated by releasing of the second brake B2 and operating of the third clutch C3 in the state of the 3rd forward speed. Then, the releasing of the second brake B2 releases the fourth sun gear S4, the operating of the third clutch C3 connects the second sun gear S2 with the first ring gear R1, and the first clutch C1 and the first brake B1 maintain the operating states thereof, respectively. Due to this, the output of the 4th forward speed is made at the first carrier CR1 of the first planetary gear set 10 as much as V4 of the horizontal line by forming a speed line of a lever line diagram by complementary operating rotation elements. The 4-speed output of the first carrier CR1 is transmitted to the differential device through the output shaft OUT, thereby the shifting of the 4th forward speed is completed.

At the 5th forward-speed, the first and third clutches C1 and C3 and the second brake B2 are operated by releasing of the first brake B1 and operating of the second brake B2 in the state of the 4th forward speed. Then, the releasing of the first brake B1 releases the first ring gear R1 and the first clutch C1 and the third clutch C3 maintain the operating states thereof, respectively. Due to this, the output of the 5th forward speed is made at the first carrier CR1 of the first planetary gear set 10 as much as V5 of the horizontal line by forming a speed line of a lever line diagram by complementary operating rotation elements. The 5-speed output of the first carrier CR1 is transmitted to the differential device through the output shaft OUT, thereby the shifting of the 5th forward speed is completed.

At the 6th forward speed, the first, third and fourth clutches C1, C3, C4 are operated by releasing of the second brake B2 and operating of the fourth clutch C4 in the state of the 5th forward speed. Then, the operating of the fourth clutch C4 connects the third carrier CR3 with the first ring gear R1, the first clutch C1 and the third clutch C3 maintain the operating states thereof, respectively. Due to this, the output of the 6th forward speed is made at the first carrier CR1 of the first planetary gear set 10 as much as V6 of the horizontal line by forming a speed line of a lever line diagram by complementary operating rotation elements. The 6-speed output of the first carrier CR1 is transmitted to the differential device through the output shaft OUT, thereby the shifting of the 6th forward speed is completed.

At the 7th forward 7-speed, the first and fourth clutches C1, C4 and the second brake B2 are operated by releasing of the third clutch C3 and operating of the second brake B2 in the state of the 6th forward speed. Then, the releasing of the third clutch C3 releases disconnects the second sun gear S2 and the first ring gear R1, the operating of the second brake B2 allows the fourth sun gear S4 to fix, and the first clutch C1 and the fourth clutch C4 maintain the operating states thereof, respectively. Due to this, the output of the 7th forward speed is made at the first carrier CR1 of the first planetary gear set 10 as much as V7 of the horizontal line by forming a speed line of a lever line diagram by complementary operating rotation elements. The 7-speed output of the first carrier CR1 is transmitted to the differential device through the output shaft OUT, thereby the shifting of the 7th forward speed is completed.

At the 8th forward speed, the third and fourth clutches C3 and C4 and the second brake B2 are operated by releasing of the first clutch C1 and operating of the third clutch C3 in the state of the 7th forward speed. Then, the releasing of the first clutch C1 disconnects the third carrier CR3 and the fourth carrier CR4, the operating of the third clutch C3 connects the second sun gear S2 with the first ring gear R1, and the fourth clutch C4 and the second brake B2 maintain the operating states thereof, respectively. Due to this, the output of the 8th forward speed is made at the first carrier CR1 of the first planetary gear set 10 as much as V8 of the horizontal line by forming a speed line of a lever line diagram by complementary operating rotation elements. The 8-speed output of the first carrier CR1 is transmitted to the differential device through the output shaft OUT, thereby the shifting of the 8th forward speed is completed.

At the 9th forward speed, the second and fourth clutches C2, C4 and the second brake B2 are operated by releasing of the third clutch C3 and operating of the second clutch C2 in the state of the forward 8-speed. Then, the releasing of the third clutch C3 disconnects the second sun gear S2 and the first ring gear R1, the operating of the second clutch C2 connects the third carrier CR3 with the fourth ring gear R4, and the fourth clutch C4 and the second brake B2 maintain the operating states thereof, respectively. Due to this, the output of the 9th forward speed is made at the first carrier CR1 of the first planetary gear set 10 as much as V9 of the horizontal line by forming a speed line of a lever line diagram by complementary operating rotation elements. The 9-speed output of the first carrier CR1 is transmitted to the differential device through the output shaft OUT, thereby the shifting of the 9th forward speed is completed.

At the 10th forward speed, the second and third clutches C2 and C3 and the second brake B2 are operated by releasing of the fourth clutch C4 and operating of the third clutch C3 in the state of the 9th forward speed. Then, the releasing of the fourth clutch C4 disconnects the third carrier CR3 and the first ring gear R1, the operating of the third clutch C3 connects the second sun gear S2 with the first ring gear R1, and the second clutch C2 and the second brake B2 maintain the operating states thereof, respectively. Due to this, the output of the 10th forward speed is made at the first carrier CR1 of the first planetary gear set 10 as much as V10 of the horizontal line by forming a speed line of a lever line diagram by complementary operating rotation elements. The 10-speed output of the first carrier CR1 is transmitted to the differential device through the output shaft OUT, thereby the shifting of the 10th forward speed is completed.

At the 1 reverse speed, the third and fourth clutches C3, C4 and the first brake B1 are operated. Then, the operating of the third clutch C3 connects the second sun gear S2 with the first ring gear R1, the operating of the fourth clutch C4 connects the third carrier CR3 with the first ring gear R1, and the operating of the second brake B2 allows the fourth sun gear S4 to fix. Due to this, the input of the input shaft IN is transmitted from the fourth ring gear R4 of the fourth planetary gear set 40 through the second ring gear R2 of the second planetary gear set 20 to the first sun gear S1 of the first planetary gear set 10, and the output of the 1 reverse speed is made at the first carrier CR1 of the first planetary gear set 10 as much as R1 of the horizontal line by forming a speed line of the lever line diagram by complementary operating rotation elements, the 1 reverse speed output of the first carrier CR1 is transmitted to the differential device through the output shaft OUT, thereby the shifting of the 1 reverse speed is completed.

As described above, the multi-stages automatic transmission for the vehicle according to various embodiments of the present invention includes a gear train including four planetary gear sets 10, 20, 30 and 40, six friction members made of the first, second, third and fourth clutches C1, C2, C3 and C4 and the first and second brakes B1 and B2, thereby the 10 forward speeds and 1 reverse speed with a various array of the first, second, third and fourth clutches C1, C2, C3 and C4 on rotation elements may be embodied, and particularly, the shifting is embodied with a sequential shift manner which takes one after loosen one of the friction members C1, C2, C3, C4, B1 and B2.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stages automatic transmission for a vehicle comprising:
   first, second, third and fourth planetary gear sets, each including first, second and third rotation elements, respectively; and
   friction members including first, second, third and fourth clutches and first and second brakes located in a torque path between an input shaft and an output shaft,
   wherein the input shaft is fixedly connected to the second rotation element of the fourth planetary gear set and the first rotation element of the third planetary gear set, the third rotation element of the fourth planetary gear set is fixedly connected to the third rotation element of the second planetary gear set, the third rotation element of the third planetary gear set is fixedly connected to the second rotation element of the second planetary gear set, the third rotation element of the second planetary gear set is fixedly connected to the first rotation element of the first planetary gear set, and the output shaft is fixedly connected to the second rotation element of the first planetary gear set.

2. The multi-stages automatic transmission for the vehicle of claim 1, wherein the first brake selectively fixes the third rotation element of the first planetary gear set, the second brake selectively fixes the first rotation element of the fourth planetary gear set, the first clutch selectively connects the second rotation element of the third planetary gear set with the second rotation element of the fourth planetary gear set, the second clutch selectively connects the second rotation element of the third planetary gear set with the third rotation element of the fourth planetary gear set, the third clutch selectively connects the first rotation element of the second planetary gear set with the third rotation element of the first planetary gear set, and the fourth clutch selectively connects the second rotation element of the third planetary gear set with the third rotation element of the first planetary gear set.

3. The multi-stages automatic transmission for the vehicle of claim 2, wherein the first planetary gear set comprises a first sun gear as the first rotation element of the first planetary gear set, a first carrier as the second rotation element of the first planetary gear set, and a first ring gear as the third rotation element of the first planetary gear set,
   the second planetary gear set comprises a second sun gear as the first rotation element of the second planetary gear set, a second carrier as the second rotation element of the second planetary gear set, and a second ring gear as the third rotation element of the second planetary gear set,
   the third planetary gear set comprises a third sun gear as the first rotation element of the third planetary gear set, a third carrier as the second rotation element of the third planetary gear set, and a third ring gear as the third rotation element of the third planetary gear set, and
   the fourth planetary gear set comprises a fourth sun gear as the first rotation element of the fourth planetary gear set, a fourth carrier as the second rotation element of the fourth planetary gear set, and a fourth ring gear as the third rotation element of the fourth planetary gear set.

4. The multi-stages automatic transmission for the vehicle of claim 3, wherein the first sun gear among the first sun gear, the first carrier and the first ring gear of the first planetary gear set is fixedly connected with the second ring gear, the first carrier is continuously fixedly connected with the output, and the first ring gear is fixedly connected to the first brake, selectively connected with the third carrier through the fourth clutch and selectively connected with the second sun gear through the third clutch.

5. The multi-stages automatic transmission for the vehicle of claim 3, wherein the second sun gear among the second sun gear, the second carrier and the second ring gear of the second planetary gear set is selectively connected with the first ring gear through the third clutch, the second carrier is fixedly connected with the third ring gear, and the second ring gear is fixedly connected with the first sun gear and the fourth ring gear.

6. The multi-stages automatic transmission for the vehicle of claim 3, wherein the third sun gear among the third sun gear, the third carrier, and the third ring gear of the third planetary gear set is fixedly connected with the fourth carrier, the third carrier is selectively connected with the fourth ring gear through the second clutch, and the third ring gear is fixedly connected with the second carrier.

7. The multi-stages automatic transmission for the vehicle of claim 3, wherein the fourth sun gear among the fourth sun gear, the fourth carrier, and the fourth ring gear of the fourth planetary gear set is fixedly connected with the second brake, the fourth carrier is selectively connected with the third carrier through the first clutch and fixedly connected with the input shaft, and the fourth ring gear is fixedly connected with the second ring gear.

8. The multi-stages automatic transmission for the vehicle of claim 1, wherein the first planetary gear set and the second planetary gear set comprise a first complex planetary gear set, the third planetary gear set and the fourth planetary gear set comprise a second complex planetary gear set, and a continuous combination route between the first complex planetary gear set and the second complex planetary gear set is formed by the second rotation element of the second planetary gear set and the third rotation element of the third planetary gear set.

9. The multi-stages automatic transmission for the vehicle of claim 8, wherein the first planetary gear set comprises a first sun gear as the first rotation element of the first planetary gear set, a first carrier as the second rotation element of the first planetary gear set, and a first ring gear as the third rotation element of the first planetary gear set,
the second planetary gear set comprises a second sun gear as the first rotation element of the second planetary gear set, a second carrier as the second rotation element of the second planetary gear set, and a second ring gear as the third rotation element of the second planetary gear set,
the third planetary gear set comprises a third sun gear as the first rotation element of the third planetary gear set, a third carrier as the second rotation element of the third planetary gear set, and a third ring gear as the third rotation element of the third planetary gear set, and
the fourth planetary gear set comprises a fourth sun gear as the first rotation element of the fourth planetary gear set, a fourth carrier as the second rotation element of the fourth planetary gear set, and a fourth ring gear as the third rotation element of the fourth planetary gear set.

10. The multi-stages automatic transmission for the vehicle of claim 9, wherein the first sun gear among the first sun gear, the first carrier and the first ring gear of the first planetary gear set is fixedly connected with the second ring gear, the first carrier is continuously fixedly connected with the output, and the first ring gear is fixedly connected to the first brake, selectively connected with the third carrier through the fourth clutch and selectively connected with the second sun gear through the third clutch.

11. The multi-stages automatic transmission for the vehicle of claim 9, wherein the second sun gear among the second sun gear, the second carrier and the second ring gear of the second planetary gear set is selectively connected with the first ring gear through the third clutch, the second carrier is fixedly connected with the third ring gear, and the second ring gear is fixedly connected with the first sun gear and the fourth ring gear.

12. The multi-stages automatic transmission for the vehicle of claim 9, wherein the third sun gear among the third sun gear, the third carrier, and the third ring gear of the third planetary gear set is fixedly connected with the fourth carrier, the third carrier is selectively connected with the fourth ring gear through the second clutch, and the third ring gear is fixedly connected with the second carrier.

13. The multi-stages automatic transmission for the vehicle of claim 9, wherein the fourth sun gear among the fourth sun gear, the fourth carrier, and the fourth ring gear of the fourth planetary gear set is fixedly connected with the second brake, the fourth carrier is selectively connected with the third carrier through the first clutch and fixedly connected with the input shaft, and the fourth ring gear is fixedly connected with the second ring gear.

14. The multi-stages automatic transmission for the vehicle of claim 1, wherein the first planetary gear set comprises a first sun gear as the first rotation element of the first planetary gear set, a first carrier as the second rotation element of the first planetary gear set, and a first ring gear as the third rotation element of the first planetary gear set,
the second planetary gear set comprises a second sun gear as the first rotation element of the second planetary gear set, a second carrier as the second rotation element of the second planetary gear set, and a second ring gear as the third rotation element of the second planetary gear set,
the third planetary gear set comprises a third sun gear as the first rotation element of the third planetary gear set, a third carrier as the second rotation element of the third planetary gear set, and a third ring gear as the third rotation element of the third planetary gear set, and
the fourth planetary gear set comprises a fourth sun gear as the first rotation element of the fourth planetary gear set, a fourth carrier as the second rotation element of the fourth planetary gear set, and a fourth ring gear as the third rotation element of the fourth planetary gear set.

15. The multi-stages automatic transmission for the vehicle of claim 14, wherein the first sun gear among the first sun gear, the first carrier and the first ring gear of the first planetary gear set is fixedly connected with the second ring gear, the first carrier is continuously fixedly connected with the output, and the first ring gear is fixedly connected to the first brake, selectively connected with the third carrier through the fourth clutch and selectively connected with the second sun gear through the third clutch.

16. The multi-stages automatic transmission for the vehicle of claim 14, wherein the second sun gear among the second sun gear, the second carrier and the second ring gear of the second planetary gear set is selectively connected with the first ring gear through the third clutch, the second carrier is fixedly connected with the third ring gear, and the second ring gear is fixedly connected with the first sun gear and the fourth ring gear.

17. The multi-stages automatic transmission for the vehicle of claim 14, wherein the third sun gear among the third sun gear, the third carrier, and the third ring gear of the third planetary gear set is fixedly connected with the fourth carrier, the third carrier is selectively connected with the fourth ring gear through the second clutch, and the third ring gear is fixedly connected with the second carrier.

18. The multi-stages automatic transmission for the vehicle of claim 14, wherein the fourth sun gear among the fourth sun gear, the fourth carrier, and the fourth ring gear of the fourth planetary gear set is fixedly connected with the second brake, the fourth carrier is selectively connected with the third carrier through the first clutch and fixedly connected with the input shaft, and the fourth ring gear is fixedly connected with the second ring gear.

* * * * *